US012651061B2

(12) United States Patent
Marom et al.

(10) Patent No.: US 12,651,061 B2
(45) Date of Patent: Jun. 9, 2026

(54) CYBERSECURITY TOOLS FOR MANAGING ANOMALOUS SECURITY DATA ITEMS

(71) Applicant: Microsoft Technology Licensing, LLC, Redmond, WA (US)

(72) Inventors: Raz Marom, Haifa (IL); Dror Cohen, Tel-Aviv (IL); Jonatan Zukerman, Matan (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 88 days.

(21) Appl. No.: 18/651,246

(22) Filed: Apr. 30, 2024

(65) Prior Publication Data

US 2025/0335584 A1     Oct. 30, 2025

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ............. G06F 21/554; G06F 2221/034; G06F 21/577; H04L 63/1441; H04L 63/1425
See application file for complete search history.

(56) References Cited

U.S. PATENT DOCUMENTS 10,270,788 B2 *  4/2019  Faigon ................... G06N 20/00
10,462,173 B1 * 10/2019  Aziz ................... H04L 63/1433

10,848,519 B2 * 11/2020  Howard ................. G06N 3/045
11,743,286 B2 *  8/2023  Du .......................... H04L 63/145
                                                                              726/22
11,973,784 B1 *  4/2024  Erlingsson ............ G06F 9/5077
12,107,872 B2 * 10/2024  Neupane ................. G06N 3/04
2018/0262529 A1 *  9/2018  Allen ..................... G06F 21/566
2020/0028871 A1    1/2020  Thayer et al.
2022/0156372 A1 *  5/2022  Harang ................. H04L 63/145
2024/0056458 A1    2/2024  Lee
2024/0250968 A1 *  7/2024  Kaleli ..................... H04L 41/16
2025/0086271 A1 *  3/2025  Achary ................. G06F 21/552
2025/0317455 A1 * 10/2025  Agron ................. H04L 63/1416

FOREIGN PATENT DOCUMENTS

WO     WO-2022251462 A1 * 12/2022   ............... G06N 5/04
WO     WO-2025193532 A1 *  9/2025   ............. G06N 3/045

OTHER PUBLICATIONS

Extended European Search Report Received in European Application No. 25173472.9, mailed on Aug. 27, 2025, 11 Pages.

(Continued)

*Primary Examiner* — Christopher A Revak
(74) *Attorney, Agent, or Firm* — Foley IP Law, PLLC

(57)     ABSTRACT

This disclosure provides a filtering mechanism to manage anomalous security data items. An anomalous security data item is provided to an analysis engine (such as a Large Language Model (LLM) or another form of generative language model) for interpretation. By curating a selection of one or more relevant non-anomalous security data items to provide with the anomalous data item, the filtering mechanism enables the analysis engine to perform with increased accuracy, without requiring the analyst engine to process large numbers of data items to ascertain their relevance to the anomalous security data item.

20 Claims, 4 Drawing Sheets

(56)                    References Cited

OTHER PUBLICATIONS

"5 Approaches to Solve LLM Token Limits", accessed on: https://deepchecks.com/5-approaches-to-solve-llm-token-limits/, DeepChecks, Oct. 2, 2023, 6 pages.

"Medium: Ai'nt That Easy #2: 4 Approaches to Solve LLM Token Limit and Rate Limit Issues", accessed on URL: https://aint-that-easy.medium.com/aint-that-easy-2-4-approaches-to-solve-llm-token-limit-and-rate-limit-issues-13cad16fa158, Jan. 23, 2024, 9 pages.

"Understanding Your SIEM Options", accessed on URL: https://gurucul.com/blog/understanding-your-siem-options, Jan. 30, 2024, 10 pages.

"What is UEBA?", accessed on URL: https://www.fortinet.com/resources/cyberglossary/what-is-ueba, Apr. 6, 2024, 10 pages.

"What is user and entity behavior analytics (UEBA)?", accessed on URL: https://www.ibm.com/topics/ueba, Apr. 6, 2024, 10 pages.

Aparna, Dhinakaran, "The Guide to LLM Evals: How to Build and Benchmark Your Evals", accessed on URL: https://towardsdatascience.com/llm-evals-setup-and-the-metrics-that-matter-2cc27e8e35f3, Oct. 13, 2023, 24 pages.

Chu, Lan, "Medium: Workarounds Large language model's token limit issues", accessed on URL: https://medium. com/the-data-perspectives/workarounds-openai-models-token-limit-issues-3ea52a60d937, Nov. 22, 2023, 8 pages.

Poduska, Josh, "LLM Monitoring and Observability—A Summary of Techniques and Approaches for Responsible AI", accessed on: https://towardsdatascience.com/llm-monitoring-and-observability-c28121e75c2f, Sep. 15, 2023, 15 pages.

Wilson, Steve, "Integrating, Instead of Disrupting: How AI Will Impact Security", accessed on URL: https://www.exabeam.com/information-security/integrating-instead-of-disrupting-how-ai-will-impact-security/, Jan. 31, 2024, 5 pages.

Yelevin, et al., "Advanced threat detection with User and Entity Behavior Analytics (UEBA) in Microsoft Sentinel", accessed on: https://learn.microsoft.com/en-us/azure/sentinel/identify-threats-with-entity-behavior-analytics, Apr. 3, 2024, 6 pages.

Yelevin, et al., "Microsoft Sentinel UEBA reference", accessed on URL: https://learn.microsoft.com/en-us/azure/sentinel/ueba-reference, Apr. 3, 2024, 17 pages.

* cited by examiner

CYBERSECURITY TOOLS FOR MANAGING ANOMALOUS SECURITY DATA ITEMS

BACKGROUND

Computer networks are used in various organizations, including businesses, universities, governmental organizations, etc. Network security is vital for keeping an organization running properly. Without such security, an organization's various computing systems and other network resources may be exposed to malicious programs. Such programs could access sensitive data, hold data and resources for ransom, or perform other damaging acts.

Security data items (such as security logs, entries or other elements of security logs etc.) may be collected and used to monitor an organisation's data, activities, computing systems, and network resources. Log files are detailed, typically text-based records of events, occurrences, behaviours, configurations etc., within an organization's IT systems. They are generated by a wide variety of devices and applications, such as antimalware, system utilities, firewalls, intrusion detection and prevention systems, servers, workstations and networking equipment.

SUMMARY

This disclosure provides a filtering mechanism to manage anomalous security data items. An anomalous security data item is provided to an analysis engine (such as a Large Language Model (LLM) or another form of generative language model) for interpretation. By curating a selection of one or more relevant non-anomalous security data items to provide with the anomalous data item, the filtering mechanism enables the analysis engine to perform with increased accuracy, without requiring the analyst engine to process large numbers of data items to ascertain their relevance to the anomalous security data item.

BRIEF DESCRIPTION OF FIGURES

Particular embodiments will now be described, by way of example only, with reference to the following schematic figures, in which.

DETAILED DESCRIPTION

Figure 1:
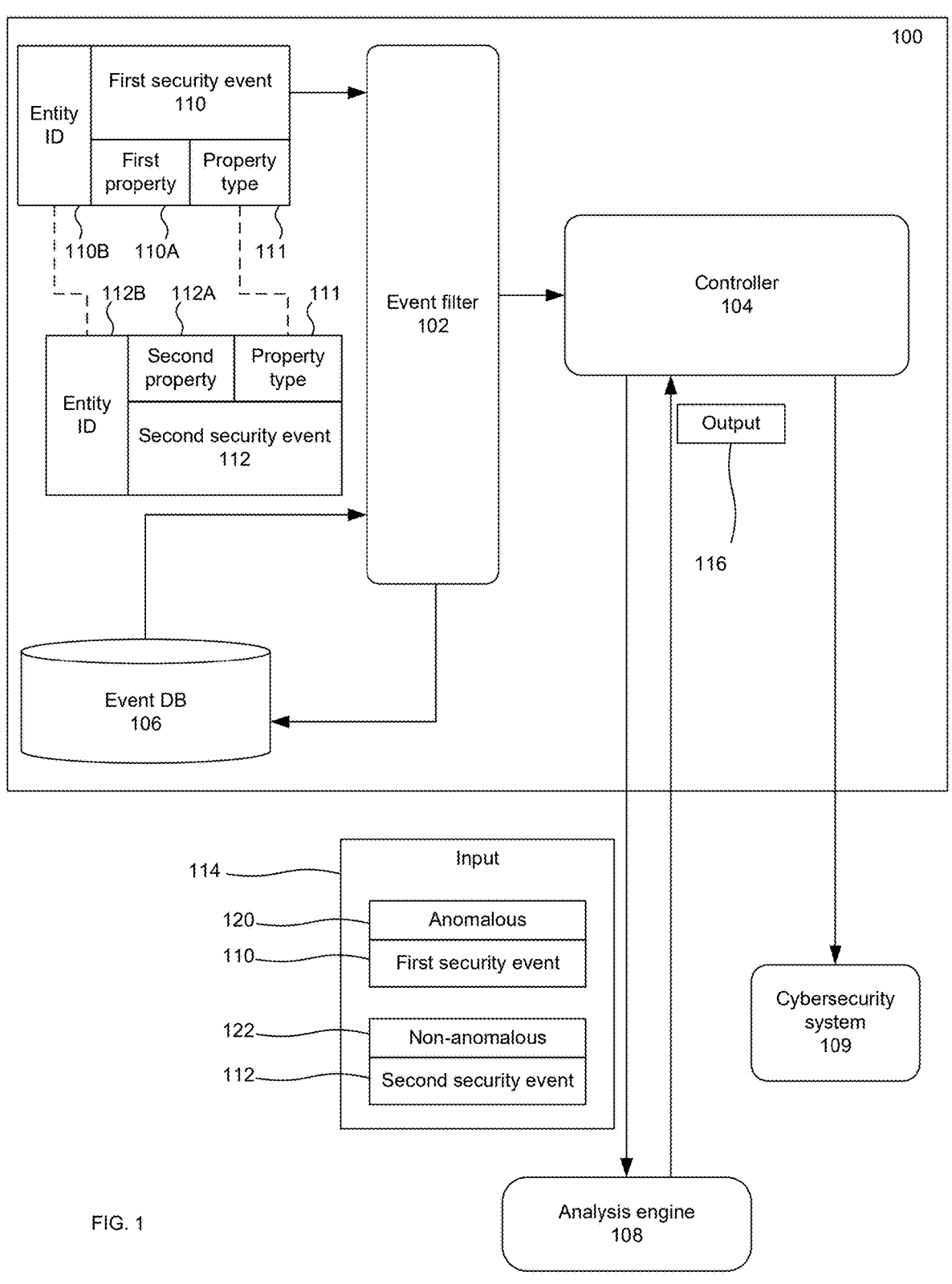
FIG. 1 shows a schematic block diagram of a first data processing system.

Increasingly powerful analysis engines can support diverse use cases in the field of cybersecurity. For example, large language models (LLMs) have demonstrated impressive security analysis capabilities. Such models can be used to process raw security data (e.g., in the form of security logs or other security data items) and extract targeted insights or analysis, which in turn can be used to trigger appropriate security actions, such as remediation and/or reporting actions.

When analyzing security data items that have been identified as anomalous, better accuracy of analysis is generally achieved when relevant context is provided to an analysis engine. In particular, a non-anomalous security data item that is related in some respect(s) to an anomalous security data item can assist the analysis engine when interpreting the anomalous data item. One approach would be to provide the analysis engine with a large, unfiltered set of contextual security data items, and rely on the analysis engine to identify contextual data item(s) that are relevant to a given anomalous data item. However, there are several issues with this approach. Certain forms of analysis engine (such as LLMs) are limited in the amount of context they can retain. With certain forms of analysis engine (such as LLMs), this limitation may be quantified in terms of a context window. In any event, processing large amounts of contextual data in a sophisticated analysis engine requires significant computational recourses, even in situations where context window limitations do not apply or are less germane (e.g., processing large amounts of data in an LLM with a large context window requires significant computational resources due to the large number of LLM weights that need to be applied in each computation).

To address the issues noted above, various filtering mechanisms are described herein to support analysis of anomalous security data items. When an anomalous security data item is received, a filtering mechanism(s) is used to curate a selection of one or more non-anomalous security data items that are relevant to the anomalous security data item. This curated selection provides an analysis engine with sufficient context to achieve a required level of accuracy when interpreting an anomalous security data item but with greatly reduced data overhead. In other words, the amount of contextual data that needs to be processed in the analysis engine is significantly reduced but in a way that minimizes loss of relevant contextual information. One application of the filtering mechanism is reducing the amount of contextual data so that it can be accommodated within the limits of an LLM context window. Moreover, even when context window limits of this nature do not apply (or are less germane), the filtering mechanism(s) described herein can be used to achieve a given level of accuracy in the analysis of an anomalous data items with greater computational efficiency. The efficiency gain is achieved as the filtering mechanism(s) can typically be implemented more efficiently than relying on the analysis engine (e.g. LLM) to identify relevant non-anomalous data item(s) from a larger set. Data filtering is typically a relatively efficient operation. Using such filtering to intelligently reduce the amount of data fed to the analysis engine is beneficial in a range of scenarios.

A data item may record a specific event that has occurred. In the field of cybersecurity sometimes such data items are themselves referred to as 'events'. However, in the following description, the term 'data item' is favored.

A security data item can be classified as anomalous or non-anomalous in various ways, e.g. using rules-based processing, machine learning classification, statistical analysis (e.g. outlier analysis) etc. Such processing may involve comparing a data item to one or more other data items. A data item may record an event that occurred. When a data item records an event, an anomalous classification assigned to the data item indicates the recorded event is anomalous.

In some embodiments, the filtering mechanism(s) are used to support an analysis engine in the form of an LLM. LLMs are a class of generative machine learning (ML) models.

'Large' models typically have of the order of a billion or more parameters (such as neural network weights). Large models have been developed with weights in excess of one hundred billion. Large models may be generative or discriminative.

'Generative' models are defined by their ability to flex-ibility generate outputs in response to given inputs.

Generative models, as opposed to discriminative models, are designed to produce a range of outputs, including new instances of data, based on their learning. For example, in cybersecurity, a generative model may be used to analyze security data items, e.g. summarizing their relevant context, or suggesting recommended remediation actions.

Large and/or generative models may be trained on cross-domain training sets, enabling the same model to be applied in a range of applications. Such models may also be trained on domain-specific training sets, such as security-specific training sets.

'Small' generative models (such as small language models) are also being developed, which aim to achieve similar or better performance than large models but with fewer parameters/weights. Rather than attempting to match large model performance models in all respects, small generative models may be more targeted to specific or narrow appli-cations.

Certain generative models generate an output in the form of a variable-length sequence of semantically meaningful tokens, such as text tokens, image tokens etc. Language models are able to generate meaningful text outputs. Multi-modal generative models can generate outputs comprising multiple modalities, such as a combination of text and image data. An input is typically provided to an LLM in the form of a prompt or sequence of multiple prompts. The LLM generates an output in response to the (or each) prompt. Prompt(s) and output(s) provided are generated within a communication session (or 'chat') with the LLM. Context within a chat is retained by the LLM, meaning that previous prompt(s)/output(s) can influence subsequent output(s). An LLM can support multiple chats but, absent some mecha-nism external to the LLM to propagate context between chats, context is not shared between those chats.

Many forms of analysis engine suffer from an intrinsic limitation relating to the maximum amount of data they can process at runtime whilst retaining relevant contextual infor-mation. For example, current LLMs have a fixed context window, which refers to an upper threshold (in tokens) on the total size of the input and the output combined that can be supported within a single chat.

Such limitations have particular ramifications in the cyber security domain, as with current generation models, the input size limitation is not sufficient to accommodate large amounts of security data that need to be processed in certain cybersecurity applications. In many security applications, it is impossible to utilize an LLM for summarization or other of all data available.

Context windows are expected to increase over time. Moreover, other forms of analysis engine may not suffer from the same intrinsic limitations on the amount of con-textual data that can be processed. Nevertheless, even with-out such limitations, processing large amounts of context data in a sophisticated analysis engine (such as a large language model) requires significant computational resources.

One way to reduce the amount of data in this context is to focus each analysis on a specific entity (such as a user account, device, application, process, service, file etc.). However, even single-entity data collected over a relevant time period may be too large to process in full.

A small portion of the data may be provided in an input (e.g., small enough to fit within an LLM context window).

However, if not properly chosen, partial data may not reflect the full activity history associated with the entity, leading to an inadequate result.

As indicated, filtering mechanisms are described herein which support the analysis of anomalous security data items by an analysis engine. In a first embodiment, a security data item with a particular anomalous property is received, and a first filtering mechanism is used to curate a selection of one or more non-anomalous security data items each with a non-anomalous property that corresponds in type to the anomalous property, but which is itself non-anomalous. In a second embodiment, an anomalous security data item asso-ciated with a particular entity is received, and a second filtering mechanism(s) is used to curate a selection of one or more non-anomalous security data items associated with the same entity. In the examples described below, these approaches are combined, to curate a set of one or more non-anomalous security data items (associated with the same entity and the anomalous security data item and with non-anomalous properties corresponding in type to its anomalous property), which on the one hand is compact, and on the other hand adequately reflects the variance of entity behavior in the relevant property.

As indicated, one application of the described techniques is selecting a compact set of contextual data (in the form of curated non-anomalous data item(s)) that can be accommo-dated within a context window of an LLM or other form of analysis engine with similar intrinsic limitations. However, as also indicated, the techniques can be used more generally to achieve a given level of accuracy in the analysis of anomalous data items with greater computational efficiency. The computational efficiency gain is achieved in the curation of non-anomalous security data item(s) that provide the required context with significantly reduced data overhead. The filtering mechanisms described herein can be imple-mented efficiently before engaging the analysis engine, yielding an overall efficiency improvement with no or minimal loss of accuracy.

FIG. 1 shows a schematic block diagram of a data processing system 100, which in turn is shown to comprise an data item filter 102 and a controller 104. The data item filter 102 and controller 104 are functional components of the data processing system 100.

The data item filter 102 is shown to receive a first security data item 110 associated with a first property 110A of a specific property type 111, and with a first entity identifier (ID) 110B.

The data item filter 102 is also shown to retrieve from a data item database (DB) 106 a second security data item 112 associated with a second property 112A of the same specific property type 111, and with a second entity ID 112B. The data item filter 102 determines one or more filtering criteria based on the first data item 110, and selects the second security data item 112 from the data item DB 106 based on the determined filtering criteria.

The controller 104 generates and provides to an analysis engine 108 an input 114, and receives an output 116 from the analysis engine 108 in response to the input 114. Based on the output, the controller 104 may trigger an appropriate security action in a cybersecurity system 109.

Figure 2:
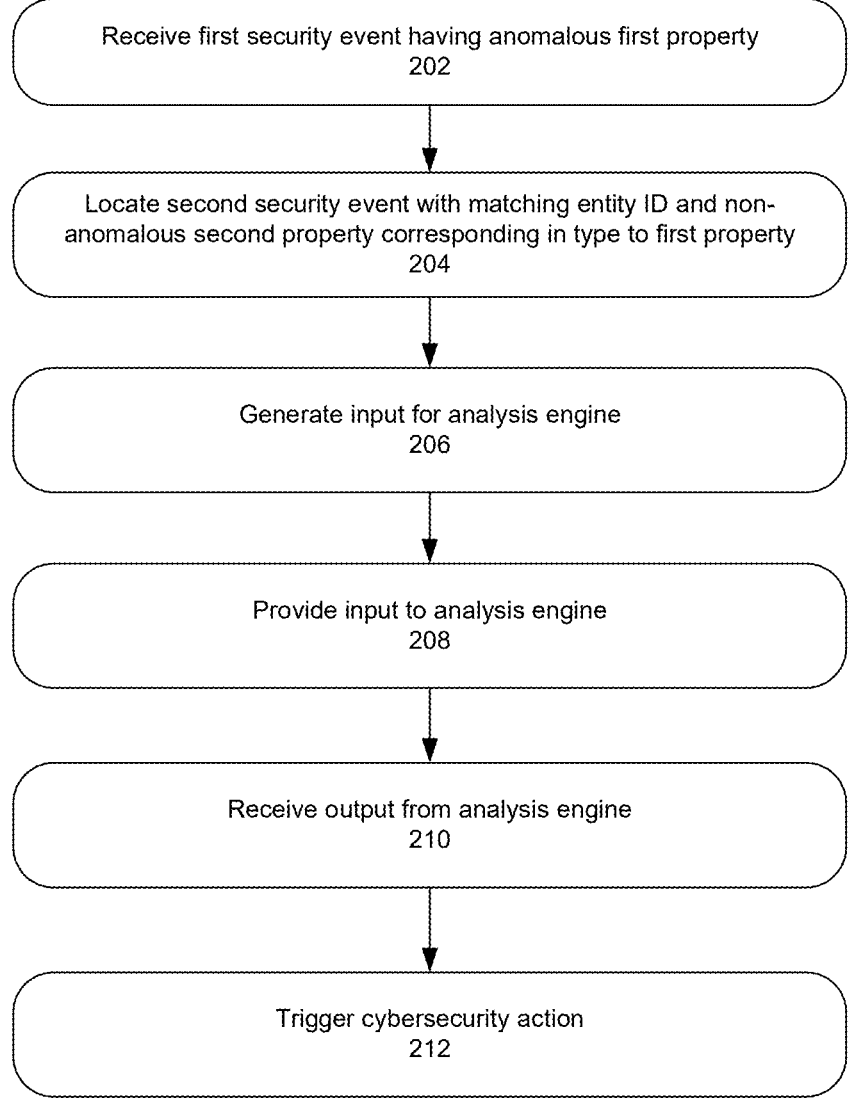
FIG. 2 shows a flowchart for a method of processing anomalous data items.

FIG. 2 shows a flow chart for a method performed in the data processing system 100 of FIG. 1.

At step 202, the data item filter 102 receives the first security data item 110.

At step 204, the data item filter 102 locates the second security data item 112 in the data item DB 106 based on the first security data item.

At step 206, the controller 104 generates the input 114 based on the first data item 110 received at the data item filter 102 and the second data item 112 retrieved from the data item DB 106.

At step 208, the controller 104 provides the input to the analysis engine 108.

At step 210, the controller 104 receives the output 116 from the analysis engine 108 in response to the input 114.

At step 212, the controller 104 causes a security action to be performed in the cybersecurity system 109 based on the output 116.

In the example depicted in FIG. 1, the data item filter 102 identifies the first property 110A as anomalous, and selects the second security data item 112 at step 204 on the basis that it is associated with the same property type 111, but the second property 112A of that property type 111 is non-anomalous. A second data item selected based on an anomalous first data item in this manner is referred to as a 'curated' data item (serving as curated context to the first data item).

In this example, an additional filtering criterion is applied in selecting the second data item 112, namely that the second entity ID 112B matches the first entity ID 110B (implying the first and second security data items 110, 112 relate to a common entity).

There may be multiple (possibly numerous) data items in the data item DB 106 that satisfy the relevant criterion or criteria. In such cases, a number of data items may be selected (e.g. randomly) from all data items satisfying the relevant criterion/criteria. The number of data items to be selected may be predefined or determined dynamically.

The input 114 is shown to comprise the first security data item 110, a first indication 120 that the first security data item 110 is anomalous, the second security data item 112, and a second indication 122 that the second security data item 112 is non-anomalous.

As illustrated by example below, the input 114 may include additional information, such as an explanation of how the first and second data items 110, 112 have been obtained. For example, when the analysis engine 108 comprises an LLM or another form of generative model (e.g. small language model with similar functionality), such information may assist the generative model in interpreting the first and second data items 110, 112. The input 114 may also instruct the generative model to adopt a specified security role, such as a security operations center (SOC) analyst, or assistant to an SOC analyst.

The input 114 may, for example, take the form of a prompt or a series of prompts provided within a particular chat in which context is retained.

The output 116 received at step 210 contains an analysis of the first security data item 110 indicated to the analysis engine 108 as anomalous that takes into account relevant context information captured in the second security data item 112 indicated as non-anomalous to the analysis engine 108.

In one embodiment, the action is a reporting action.

For example, in implementation, the analysis engine 108 provides in the output 116 a summary or other report (e.g. with suggested remediation action(s)). In this case, the reporting action may comprise outputting the report to an analyst, e.g. via a graphical user interface (GUI).

Not all anomalous data items are indicative of true security threats. In practice, many will be benign. In some cases, the output 116 may indicate whether an anomalous data item appears to be benign or indicate a genuine threat.

The latter may trigger a suitable alert to be generated, e.g. at a GUI available to an analyst, which indicates the potential threat.

In another embodiment, the action is a remediation action. For example, if the output 116 recommends a remediation action (e.g., revoking or restricting an access privilege associated with a user account, device, or other entity, e.g. locking a user account, or revoking administrator privileges; quarantining a file or software entity such as an application, process or service; or isolating a device from a network or system etc.), the recommended remediation action may be triggered automatically.

In some embodiments, a data item may be associated with multiple such properties of different property types. A data item may be anomalous in a first property type but non-anomalous in a second property type. Unless context demands otherwise, an anomalous data item means a data item having at least one anomalous property (the data item may or may not have an additional non-anomalous property or properties). The method may be separately performed in respect of each anomalous property associated with a data item.

Depending on the implementation, it may be that not all property types are relevant to each data item. Therefore, different data items may be associated with different property types or different combinations of property types.

In some implementations, 'raw' security data items are subject to an enrichment stage, prior to performing the method of FIG. 2, in which properties are determined and the raw security data items are enriched with the determined properties. In such implementations, the first and second data items 110, 112 may be enriched data items that include their respective properties 110A, 112A, with which they have been augmented during enrichment.

In some embodiments, each property is a feature value (e.g., categorical feature value or numerical feature value) and the property type 111 is a feature. For example, in one embodiment, each property 110A, 112A is a boolean feature value (TRUE/FALSE value) which indicates whether the data item is anomalous (e.g., TRUE) or non-anomalous (e.g. FALSE) in a given feature (the property type 111 in this example).

A boolean feature denotes a binary classification of the data item with respect to a specific property type. A property could also be a non-binary classification with respect to more than two classes, e.g. multiple anomalous classes and/or multiple non-anomalous classes. A feature could also be a numerical value, such as an anomaly score.

Features may be assigned using rules-based analysis, in which predefined rules or heuristics are used to detect when a data item is anomalous in relation to other data items. In this case, each feature may be characterized by a semantic feature name in natural language. Such feature names are interpretable to both humans and language models.

The described techniques can also be applied with features that are less interpretable in this sense. For example, a property could be a component of an ML embedding vector assigned to a data item by an ML feature detector. In this case, a property type may be a specific dimension in feature space (such as an ML feature embedding space). Statistical analysis may be used in this case to identify specific feature dimension(s) in which a data item is anomalous. To facilitate the analysis, the analysis engine 108 may, in this case, be provided with information about how the features have been assigned (e.g. details of an ML feature extractor used to extract the features).

A property could also take other forms such as a feature vector. For example, different types of feature vector could be assigned to a data item, and a particular feature vector may be classed as anomalous (e.g. as a statistical outlier with respect to other feature vectors of the same type). As in the previous example, in such cases, the controller 104 may provide the analysis engine 108 with details of a method used to compute the feature vectors.

An example implementation will now be described, in which data item properties take the form of features assigned to data items in an enrichment pre-processing. The description applies equally to other property types, such as numerical/ML features, non-binary classification features, feature vectors etc.

Figure 3:
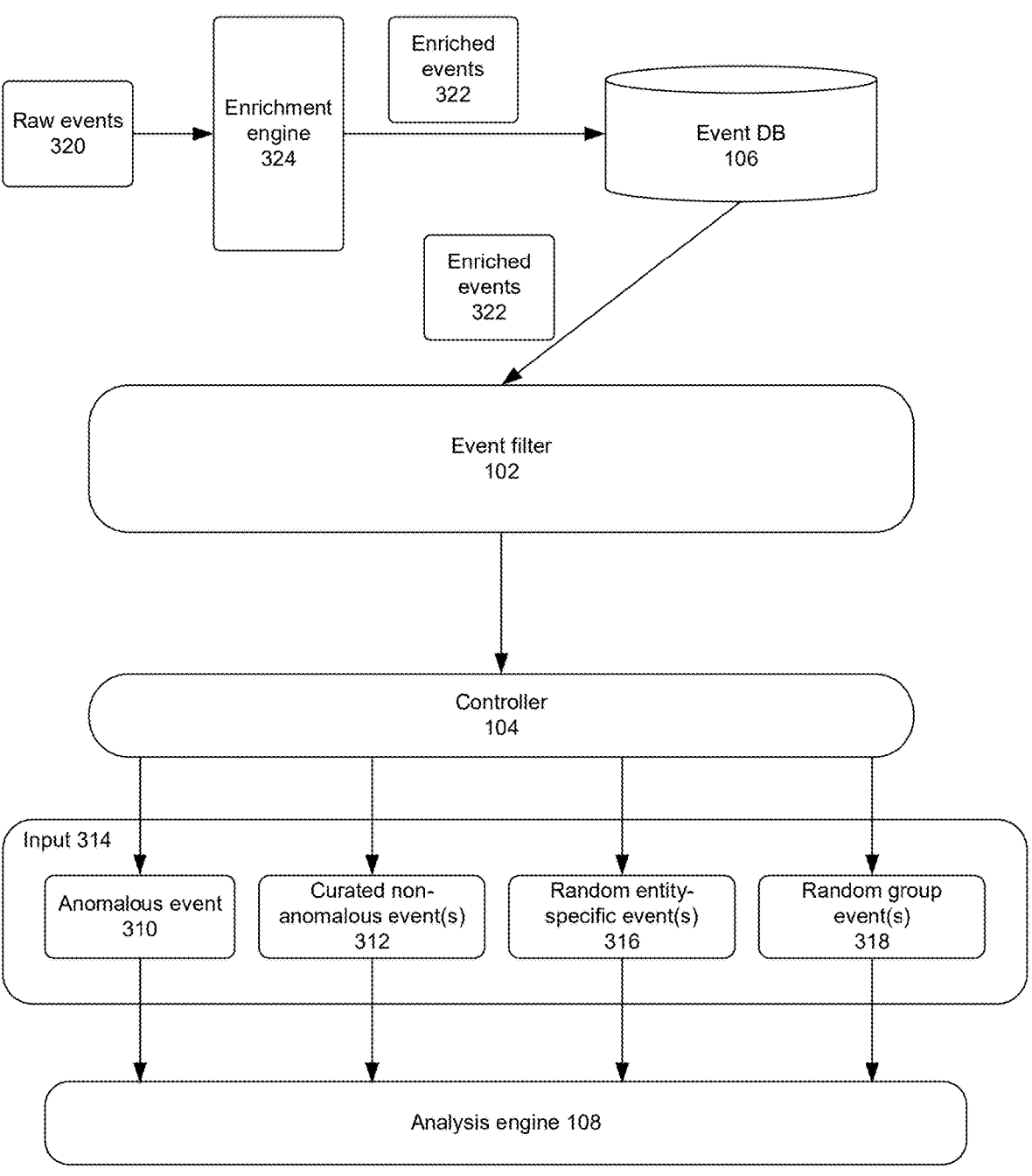
FIG. 3 shows a schematic block diagram of a second data processing system.

FIG. 3 shows a schematic block diagram of a data processing system in the aforementioned example implementation.

A. Data Item Enrichment

An enrichment engine 324 is shown. The enrichment engine 324 receives raw security data items 320 and enriches those data items with detected features, resulting in enriched data items 322. Examples of security data items include security logs, activities recorded in an active directory (e.g. an active directory associated with a cloud computing system), security audit data items (e.g., control/ management logs, data plane logs etc.), sign-in or log-on data items (e.g. received from an operating system), and/or new process creations (e.g. data items denoting creations of new processes within an operating system) etc.

Data item enrichment, broadly speaking, involves two elements: the assignment of one or more relevant property types to each raw data item (certain property types may not be relevant to certain types of data item, different types of data items may be assigned different property types or different combinations of property types); and the enrichment with a determined property (e.g. TRUE/FALSE) value for each assigned property type.

The enriched data items 322 are stored in the data item DB 106, where they are accessible to the data item filter 102. For example, the data item filter 102 may periodically retrieve any new data items having at least one anomalous property, and apply to each such anomalous data item 310 the processing steps of FIG. 2. In this manner, an input 314 is created for each anomalous data item 310.

In some examples, the enrichment engine 324 comprises a user entity and behavior analytics (UEBA) engine. The following example considers boolean features assigned using rules-based processing to features described by semantic feature names. In some implementations, operations performed by the UEBA engine include entity resolution (identifying different entity IDs corresponding to the same entity); contextual enrichment, such as extraction of location from internet protocol (IP) address, computing a blast radius of the entity in the organization, and IP Threat intelligence data processing and profiling. During profiling, a set of predefined features describing entity (e.g. user, device etc.) behavior based on data recording historic entity behavior is extracted. For example, a first feature might indicate whether a data item records the first usage of a device associated with a particular user account. A second feature might indicate whether a user IP address associated with a data item is common in a workspace that includes the user account. A third feature might indicate if the data item records unusual traffic for the user etc.

Entity resolution can assist in matching different data items based on entity identifier when locating entity-specific data items.

For each input data item, the output of the UEBA engine comprises the data of the original data item, resolved entity data, a list of applicable features and a binary classification value for each feature (anomalous/non-anomalous). Features may include information such as 'first seen' indicators, peers popularity, or scope popularity. Scope popularity measures a level of popularity that each feature had within a group such as an organization workspace. For example, if the feature is "Country", the "scope popularity" will be a value describing how common it is to perform an operation from the specified country in the workspace. Peers popularity is similar to scope popularity, but in this case popularity of the feature is measured in comparison to a predetermined number of peers related to the entity (e.g. entities which are related because they performed an action related to a given anomalous feature).

Features are added based on contextual analysis of entity activities against behavior profiles to detect anomalies. Anomalous features are identified by comparing observed activities captured in the raw data items 320 with established behavioral norms to identify deviations.

Features may relate to specific actions or activities, which can be classified as anomalous in various ways. One such feature is a "first time user performed action" feature, which denotes whether an action has been executed for the first time by a user within a specified observation period. Similarly, an "action uncommonly performed by user" feature reveals if an activity is atypical for a user within a defined time window. An "action uncommonly performed among peers" feature enhancement compares a user's actions with those of their peers over a defined baseline time period, while "first time action performed in tenant" and "action uncommonly performed in tenant" features convey the rarity of an action within an entire organization (tenant), both with a predefined observation period. The monitoring extends to application usage with features such as "first time user used application," identifying a user's initial engagement with an application over a defined period, and "application uncommonly used by user," highlighting infrequent application interactions within a defined baseline period. Features may also relate, for example, to internet browsing behavior. For example, "first time user connected via browser" and "browser uncommonly used by user" features track initial use of a browser and its uncommon use, respectively, each within predefined baseline periods. Geolocational activity may be captured in features such as "first time user connected from country," recording a user's first connection from a new geographic location within a predefined time period. Device usage patterns may be similarly analyzed, with features such as "first time user connected from device" and "device uncommonly used by user," which record the first use of a new device and uncommon usage of a device over respective time periods. Each such feature serves as anomalous activities, delivering critical insights that bolster the investigation of security incidents and aid in the detection of potential threats within an enterprise environment.

In all of the previous examples, a feature value of 'TRUE' means the feature in question is anomalous. When a data item with such a feature is found, data item curation involves finding one or more data items with the same feature but a 'FALSE' value.

B. Data Item Filter Stage

The data item filter 102 extracts the following four categories of data items:

1. Anomalous data items: data items of the given entity in a certain timeframe, which had an anomalous feature.

2. Non anomalous data items: for each anomalous feature found, the data item filter 102 extracts a data item in which this feature was not anomalous. For example, if the anomalous feature is 'Country' (e.g. country a user connected from), the data item filter 102 will extract a data item with the Country feature, but in which Country is not anomalous. As indicated, a feature may not be applicable to all data items. Thus, with e.g. the Country feature, there may be data items (i) with an anomalous Country feature (associated with the Country feature having the 'anomalous' feature value), (ii) with a non-anomalous country feature (associated with the Country feature having the 'non-anomalous' feature value) and (iii) not associated with Country feature. Category 2 data item(s) are selected from (ii). The e.g. Country feature for data items in (ii) is said to correspond in type with the anomalous e.g. Country feature of the anomalous data item, whereas data items in (iii) do not have a feature that corresponds in type to the anomalous feature e.g. County.

3. Randomly selected non anomalous data items: extract a small constant number of random non-anomalous data items for the given entity. A data item is non-anomalous if it has no anomalous feature. Note, data items in this category are selected independently of the anomalous feature (e.g. independently of 'Country' in the previous example), and could therefore include data items which are not associated with the anomalous feature at all, e.g. (iii) in the previous example. Data items in category 3 may be selected from a larger corpus of data items than data items in category 2 (e.g. from (i) and (iii) or from only (iii) in the previous example).

4. Non-anomalous data items in entity group: for each feature, find the attribute value which appears the most in an entity group with which the given entity is associated. For example, the entity group could be a group of entities belonging to a particular organization (referred to as a 'workspace'). Extracts the latest data item for each attribute type. For example, for the case of the feature 'Country', the data item filter 102 extracts data items with the most common country in the entity group. In this manner, relevant context from one or 2, selected using the method of FIG. 2), at least one randomly selected non-anomalous data item 316 (category 3) and at least one anomalous group data item 318 (category 4).

In this example, each curated non-anomalous data item 312 is selected on the basis that it is (i) associated with a matching entity identifier and (ii) associated with a matching property type and (iii) is not anomalous in any property type applicable to that data item (including the matching property type).

In some examples, an entity ID is received as input to the data item filter 102. The inputted entity ID is used to locate any anomalous data items for the identified entity, and to locate relevant contextual data items.

In order to limit the size of the input 314 (e.g. limiting its size in tokens so as not to exceed a token limit of an LLM prompt), the output size of each of categories 2-4 above may be limited to a predetermined number of data items.

Data items in categories 1-4 above may be retrieved using structured queries on the data item DB 106 in an appropriate query language. Examples of such queries are provided below purely for the sake of illustration. The following examples consider user identifiers but the same techniques can be applied with other types of entity (such as devices).

1. Anomalous Data Items

An appropriate query for obtaining data items in category 1 might be:

```
let entityName = "Administrator";
BehaviorAnalytics
| where TimeGenerated >ago(1d)
//Extracts all data from the given user
| where UserName == entityName
//ActivityInsights is a column containing features. Features which are True
are considered anomalous
| where ActivityInsights contains "True"
| take 10
```

2. Non Anomalous Data Items

Data items in category 2 are obtained in two steps.

Step one comprises extracting any anomalous features names of the given user, which can be performed as follows:

```
//step 1: extract all the anomalous features
let entityName = "administrator";
BehaviorAnalytics
| where UserName == entityName
| where ActivityInsights contains "True"
| mv-expand ActivityInsights
| where ActivityInsights contain" "True"
| extend anomalousFeatureName=tostring(split(ActivityInsights, ":")[0])
| extend anomalousFeatureName = replace_regex(anomalousFeaturName, '{"|"",
'')
| distinct anomalousFeatureName
``` more other entities (different than the entity with which the anomalous data item is associated but belonging to the same entity group) is selected for the analysis stage. Category 4 excludes data items that are not associated with the anomalous feature (e.g. (iii) would be excluded in the above example), but the corpus of data items from which category 4 data items are selected is again larger, as that corpus is extended to other entities.

The input 314 of FIG. 3 thus comprises four categories of data item: the anomalous data item 310 itself (category 1), at least one curated non-anomalous data item 312 (category For example, the above query might return a list of four features:

'FirstTimeUserFailedToLoggedOnToDevice', 'First-TimeUserConnectedFromCountry',

'SimilarActionWasNotPerformedInThePast', and 'First-TimeUserPerformedAction'.

Step two comprises, for each feature, extracting an example for data items in which the feature is not anomalous, e.g. with the following query:

```
//step 2: extract non-anomalous data items for the given features
let entityName = "Administrator";
BehaviorAnalystics
| where UserName == entityName
| mv-expand ActivityInsights
| where ActivityInsights['FirstTimeUserFailedToLoggedOnToDevice']== "False"
or
    ActivityInsights['FirstTimeUserConnectedFromCountry']== "False" or
    ActivityInsights['SimilarActionWasNotPerformedInThePast']== "False"
or
    ActivityInsights['FirstTimeUserPerformedAction']== "False"
| take 10
```

3. Randomly Selected Non Anomalous Data Items

An appropriate query for obtaining data items in category 3 might be:

```
let entityName = "Administrator";
BehaviorAnalystics
| where UserName == entityName
| where ActivityInsights notcontains "True"
| take 10
```

4. Non Anomalous Data Items in Workspace

Category 4 data items are demonstrated using the Country feature. This part can also be performed on other features, such as UserAgent, ISP, device Name, Action type, etc.

This part is composed of two stages—finding the most popular country, and the extracting the latest data item from this country, e.g.:

```
//step 1 - extract most popular country
BehaviorAnalytcis
| summarize count(2) by SourceIPLocation
```

Suppose the result with the highest count is 'Lithuania'. The next stage might involve the query:

```
//step 2 - extract the latest data item from the most popular country
BehaviorAnalytics
| where SourceIPLocation contains "Lithuania"
| top 1 by TimeGenerated
```

As a further example, consider a case in which a user that typically connects from the UK performs an unusual operation from USA. In this example, the most common country used in the organization is Spain. In this case, the data item filterer will detect 'Country' as an anomalous feature, and will fetch the following data items:

1. Anomalous data item: The data item that records the user sign in from USA, as this feature is anomalous.
2. Non-Anomalous data items: A recent data item in which the user signed in from UK (as the user usually signs in from UK).
3. Randomly selected Non-Anomalous data items: A randomly selected group of data items in which the user performed a sign in without anomalous features. This batch may include data items in which the logon was from the UK, and may also contains other non-anomalous countries.
4. Non-Anomalous in Workspace: the most recent sign in data item in the organization which was performed from Spain (which is the most common country in the organization).

C. Analysis Engine

In an inference stage, data items obtained in previous stage are sent to the analysis engine 108, which takes the form of an LLM engine in this example. The LLM is assigned a task of data item summarization. Processing by the analysis engine 108 is performed in two stages: inference and analysis.

The initialization stage is a one-time process to initialize the LLM. The execution stage subsequently occurs by demand, whenever there is a request for user summarization. Initialization Stage The inference stage starts with a short introduction which is used as a system assistant prompt. The inference stage gives the LLM appropriate context, as well as an explanation on what inputs to expect in the execution stage.

As an example, the controller 104 may initialize the LLM with an initial prompt as follows (here, the term 'event' is used to refer to a data item, consistent with the terminology sometimes used in the field of cybersecurity):

"You are an assistant to SOC analysts. Your goal is to summarize entity behavior into a simple paragraph. For this purpose, you will be given raw security events that were processed by a UEBA engine and enriched with UEBA attributes. The events given will be composed of 4 batches. The first batch contains anomalous events for the given entity. The second batch contains common events for the entity. The third batch contains randomly selected, non-anomalous events for the entity. The fourth batch contains common events in the workspace.

Execution Stage

Given a request for entity summarization, the controller 104 generates an execution prompt with the following structure:

<list of anomalous events>
<list of common events>
<list of non-anomalous randomly selected events>
<list of common events in the workspace>

To further illustrate the principles, a simpler example is considered. An input is provided to the LLM which comprises a first data item with an anomalous 'FirstTimeUserConnectedFromCountry' feature, and a second-non-anomalous data item. The first and second data items are associated with a common user identifier. The prompt indicates the first data item as anomalous and the second data item as non-anomalous, and tasks LLM with summarizing the user data.

The following text demonstrates a possible output of the system, for a user named "Administrator":

"User Administrator from Germany connected to the network using a new device (Samsung Galaxy S20) and a new user agent (Mozilla/5.0 (Linux; Android 10; SM-G981B) AppleWebKit/537.36 (KHTML, like Gecko) Chrome/83.0.4103.106 Mobile Safari/537.36) that has not been seen before.

On Jul. 15, 2021, the user accessed sensitive data (financial records) outside of their normal working hours between 8:00 PM and 10:00 PM GMT+2. On Jul. 16, 2021, the user performed an anomalous operation in Azure Active Directory (AAD), attempting to reset the password for an account they do not normally access at 3:00 AM GMT+2.

However, based on the common behavior of the user and the organization, most users typically connect to the network from devices registered to their name and use user agents associated with their role, such as Mozilla/5.0 (Windows NT 10.0; Win64; x64) AppleWebKit/537.36 (KHTML, like Gecko) Chrome/83.0.4103.116 Safari/537.36.

The most common country for users to log in from is the United States, and non-anomalous operations that User Administrator typically performs in AAD include resetting their own password or updating their account information.

They access data related to their job function during normal working hours.

There are occasional instances where users may access sensitive data outside of their normal working hours, but this is typically explained by legitimate reasons such as working remotely or catching up on work outside of regular hours."

Whilst the above example considers data item summarization, as noted, the techniques can be extended to other forms of analysis, such as identifying an appropriate remediation action(s) (if any) in response to an anomalous data item.

Figure 4:
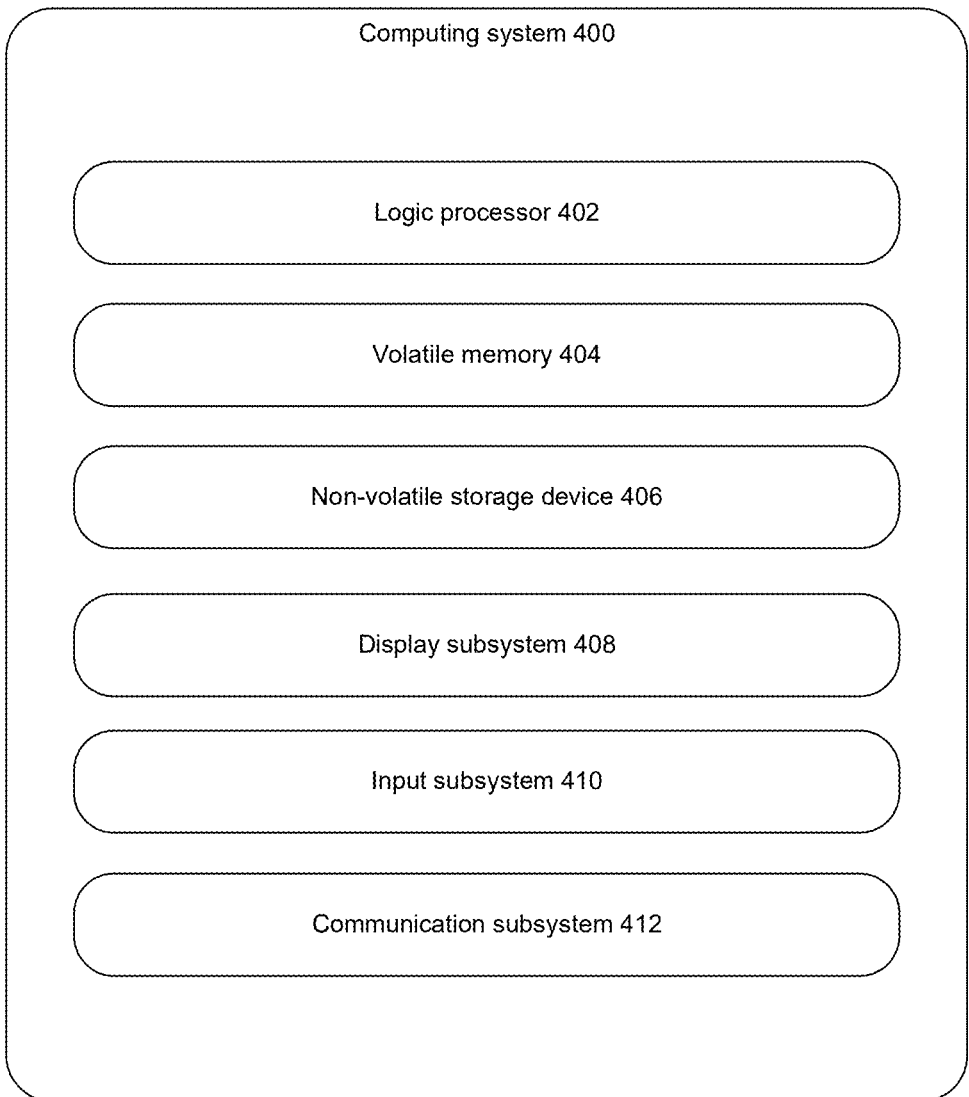
FIG. 4 shows a schematic block diagram of a computing system.

FIG. 4 schematically shows a non-limiting example of a computing system 400, such as a computing device or system of connected computing devices, that can enact one or more of the methods or processes described above, including the filtering of data and implementation of the structured knowledge base described above. Computing system 400 is shown in simplified form. Computing system 400 includes a logic processor 402, volatile memory 404, and a non-volatile storage device 406. Computing system 400 may optionally include a display subsystem 408, input subsystem 410, communication subsystem 412, and/or other components not shown in FIG. 4. Logic processor 402 comprises one or more physical (hardware) processors configured to carry out processing operations. For example, the logic processor 402 may be configured to execute instructions that are part of one or more applications, programs, routines, libraries, objects, components, data structures, or other logical constructs. The logic processor 402 may include one or more hardware processors configured to execute software instructions based on an instruction set architecture, such as a central processing unit (CPU), graphical processing unit (GPU) or other form of accelerator processor. Additionally or alternatively, the logic processor 402 may include a hardware processor(s)) in the form of a logic circuit or firmware device configured to execute hardware-implemented logic (programmable or non-programmable) or firmware instructions. Processor(s) of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 402 may be virtualized and executed by remotely accessible, networked computing devices configured in a cloud-computing configuration. In such a case, these virtualized aspects are run on different physical logic processors of various different machines. Non-volatile storage device 406 includes one or more physical devices configured to hold instructions executable by the logic processor 402 to implement the methods and processes described herein. When such methods and processes are implemented, the state of non-volatile storage device 406 may be transformed—e.g., to hold different data. Non-volatile storage device 406 may include physical devices that are removable and/or built-in. Non-volatile storage device 406 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 406 may include nonvolatile, dynamic, static, read/write, read-only, sequential-access, location-addressable, file-addressable, and/or content-addressable devices. Volatile memory 404 may include one or more physical devices that include random access memory. Volatile memory 404 is typically utilized by logic processor 402 to temporarily store information during processing of software instructions. Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 408 may be used to present a visual representation of data held by non-volatile storage device 406. The visual representation may take the form of a graphical user interface (GUI). As the herein-described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices. When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the internet. The term computer readable media as used herein may include computer storage media. Computer storage media may include volatile and non-volatile, removable and nonremovable media (e.g., volatile memory 404 or non-volatile storage 406) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 400 or a component device thereof). Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

A first aspect herein is directed to a computer system comprising: at least one memory configured to store computer-readable instructions; and at least one processor coupled to the at least one memory, and configured to execute the computer-readable instructions, which upon execution cause the at least one processor to perform operations comprising: receiving a first security data item associated with an anomalous first property; based on the anomalous first property, locating in a data item database a second security data item associated with a non-anomalous second property corresponding in type to the anomalous first property; generating an input comprising: the first security data item, a first indication that the first security data item is anomalous, the second security data item, and a second indication that the second security data item is non-anomalous, providing the input to an analysis engine; receiving an output from the analysis engine in response to the input; and causing a security action to be performed based on the output.

In embodiments, the security action may pertain to an entity associated with the first security data item.

The security action may comprise generating at a user interface an alert pertaining to the entity, revoking or restricting an access privilege associated with the entity, quarantining the entity, or isolating the entity from a network or system.

The entity may, for example, be a user account, a device, an application, a process, a service, or a file.

The first security data item may comprise a first entity identifier and the second security data item may comprise a second entity identifier, the first entity identifier and the second entity identifier each identifying the entity. The operations may comprise determining that the first entity identifier matches the second user identifier, the input being generated based on identifying the second property as non-anomalous and determining that the first entity identifier matches the second user identifier.

The operations may comprise randomly selecting from the data item database a third security data item associated with a third entity identifier determined to match the first entity identifier, the input comprising the third security data item.

In some examples, the third security data item may be randomly selected independently of the property type.

In some examples, it may be that the third security data item is not associated with the property type.

The operations may comprise, based on the property type, randomly selecting from the data item database a fourth security data item associated with the property type and comprising fourth data item data, the input comprising the fourth data item data.

The fourth security data item may, for example, be selected based on determining that the fourth data item is associated with an entity group to which the first entity identifier belongs.

The property type may be one of multiple property types with which the second security data item is associated, and the input may be generated based on identifying that none of the multiple property types is associated with an anomalous property in the second security data item.

The analysis engine may comprise a generative model, and the input comprise a description of how the first data item data and the second data item data have been obtained, and an output generation instruction.

The input may additionally comprise an indication of a security role to be adopted by the generative model.

The the at least one processor may be configured to implement an enrichment engine configured to: determine based on the first security data item the anomalous first property, associate the anomalous first property with the first security data item, determine based on the second security data item the non-anomalous second property, associate the non-anomalous second property with the first security data item, A second aspect is directed to a method, comprising: receiving an anomalous first security data item; determining a first entity identifier associated with the anomalous first security data item; based on the first entity identifier, locating in a data item database a second security data item associated with a second entity identifier determined to match the first entity identifier; generating an input comprising: the first security data item, a first indication that the first security data item is anomalous, the second security data item, and a second indication that the second security data item is non-anomalous, providing the input to an analysis engine; receiving an output from the analysis engine in response to the input; and causing a security action to be performed based on the output.

The method may comprise determining an anomalous first property associated with the anomalous first security data item. The second security data item may be located in the data item database based on: the first entity identifier, and the anomalous first property, the second security data item being associated with a non-anomalous second property corresponding in type to the anomalous first property.

The method may comprise randomly selecting from the data item database, independently of the property type, a third security data item associated with a third entity identifier determined to match the first entity identifier, the input comprising the third security data item.

The security action may pertain to an entity identified by the first entity identifier and the second entity identifier.

The security action may comprise generating at a user interface an alert pertaining to the entity, revoking or restricting an access privilege associated with the entity, quarantining the entity, or isolating the entity from a network or system.

A third aspect herein is directed to a computer-readable storage medium embodying computer-readable instructions, configured when executed by at least one processor to cause the at least one processor to perform operations comprising: receiving a first security data item associated with an anomalous first property; determining a first entity identifier associated with the first security data item; based on the anomalous first property and the first entity identifier, locating in a data item database a second security data item that is (i) associated with a non-anomalous second property corresponding in type to the anomalous first property, and (ii) associated a second entity identifier determined to match the first entity identifier; generating an input comprising: the first security data item, a first indication that the first security data item is anomalous, the second security data item, and a second indication that the second security data item is non-anomalous, providing the input to an analysis engine; receiving an output from the analysis engine in response to the input; and causing a security action to be performed based on the output.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claims.

The invention claimed is:

1. A computer system comprising:
at least one processor; and
at least one memory configured to store programming instructions for execution by the at least one processor, the programming instructions, upon execution by the at least one processor, causing the computer system to perform the following operations:
receiving an anomalous data item corresponding to an anomalous event;
identifying at least a contextual data item by filtering contextual data in a database based on a property of the anomalous data item, wherein the contextual data item is non-anomalous;
generating an input prompt that includes the anomalous data item, an indication that the anomalous data item is anomalous, the contextual data item, and an indication that the contextual data item is non-anomalous;
providing the input prompt to a machine learning (ML) model trained to perform security analysis, the input prompt prompting the ML model to generate an output;
receiving the output from the ML model in response to the input prompt; and
causing a security action to be performed based on the output.

2. The computer system of claim 1, wherein the security analysis, for which the ML model is trained, includes at least a security operations center (SOC) operation.

3. The computer system of claim 1, wherein the ML model is trained to summarize anomalous behavior.

4. The computer system of claim 1, wherein the ML model is trained to suggest remediation action(s) in response to anomalous behavior.

5. The computer system of claim 1, wherein the security action includes generating, at a user interface, an alert pertaining to an entity associated with the anomalous data item.

6. The computer system of claim 1, wherein the security action includes revoking or restricting an access privilege of an entity associated with the anomalous data item.

7. The computer system of claim 1, wherein the security action includes quarantining an entity associated with the anomalous data item or isolating the entity from a network or system.

8. The computer system of claim 1, wherein the anomalous data item and the contextual data item are both associated with a common entity.

9. The computer system of claim 8, wherein the common entity is a common user account or device.

10. The computer system of claim 8, wherein the common entity is a common application, process, service, or file.

11. The computer system of claim 1, wherein the property of the anomalous data item is a feature value.

12. The computer system of claim 11, wherein the property of the anomalous data item is a numerical feature value.

13. The computer system of claim 11, wherein the property of the anomalous data item is a categorical feature value.

14. The computer system of claim 11, wherein the property of the anomalous data item is a Boolean feature value.

15. The computer system of claim 1, wherein a non-anomalous feature of the contextual data item corresponds in type to an anomalous feature of the anomalous data item.

16. The computer system of claim 15, wherein the anomalous feature of the anomalous data item is a geolocational activity.

17. The computer system of claim 16, wherein the anomalous feature of the anomalous data item is an anomalous country, and wherein the non-anomalous feature of the contextual data item is a non-anomalous country that is different than the anomalous country.

18. The computer system of claim 15, wherein the anomalous feature of the anomalous data item is a device usage pattern or action history of a user.

19. A method comprising:
receiving an anomalous data item corresponding to an anomalous event;
identifying at least a contextual data item by filtering contextual data in a database based on a property of the anomalous data item, wherein the contextual data item is non-anomalous;
generating an input prompt that includes the anomalous data item, an indication that the anomalous data item is anomalous, the contextual data item, and an indication
that the contextual data item is non-anomalous;
providing the input prompt to a machine learning (ML)
model trained to perform security analysis, the input
prompt prompting the ML model to generate an output;
receiving the output from the ML model in response to the
input prompt; and
causing a security action to be performed based on the
output.
20. A computer-readable storage medium storing programming instructions that, upon execution by a processor
of a system, cause the system to perform the following
operations:
receiving an anomalous data item corresponding to an
anomalous event;
identifying at least a contextual data item by filtering
contextual data in a database based on a property of the
anomalous data item, wherein the contextual data item
is non-anomalous;
generating an input prompt that includes the anomalous
data item, an indication that the anomalous data item is
anomalous, the contextual data item, and an indication
that the contextual data item is non-anomalous;
providing the input prompt to a machine learning (ML)
model trained to perform security analysis, the input
prompt prompting the ML model to generate an output;
receiving the output from the ML model in response to the
input prompt; and
causing a security action to be performed based on the
output.

\* \* \* \* \*